(12) United States Patent
Nakahira et al.

(10) Patent No.: US 12,063,643 B2
(45) Date of Patent: Aug. 13, 2024

(54) WIRELESS COMMUNICATION SYSTEM, WIRELESS COMMUNICATION METHOD, AND WIRELESS STATION DEVICE

(71) Applicant: Nippon Telegraph and Telephone Corporation, Tokyo (JP)

(72) Inventors: Toshiro Nakahira, Musashino (JP); Hirantha Abeysekera, Musashino (JP); Tomoki Murakami, Musashino (JP); Koichi Ishihara, Musashino (JP); Takafumi Hayashi, Musashino (JP); Yasushi Takatori, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 344 days.

(21) Appl. No.: 17/610,755

(22) PCT Filed: Jun. 10, 2019

(86) PCT No.: PCT/JP2019/022983
§ 371 (c)(1),
(2) Date: Nov. 12, 2021

(87) PCT Pub. No.: WO2020/250286
PCT Pub. Date: Dec. 17, 2020

(65) Prior Publication Data
US 2022/0232587 A1  Jul. 21, 2022

(51) Int. Cl.
*H04W 72/12*  (2023.01)
*H04W 72/02*  (2009.01)
(Continued)

(52) U.S. Cl.
CPC ....... *H04W 72/1263* (2013.01); *H04W 72/02* (2013.01); *H04W 72/569* (2023.01); *H04W 88/06* (2013.01)

(58) Field of Classification Search
CPC ................................................. H04W 72/1263
See application file for complete search history.

(56) References Cited

U.S. PATENT DOCUMENTS

2017/0289837 A1* 10/2017 Duo .................... H04L 47/2433

FOREIGN PATENT DOCUMENTS

| JP | 2006332844 | 12/2006 |
| JP | 2014230078 | 12/2014 |
| JP | 2015226261 | 12/2015 |

OTHER PUBLICATIONS

Abeysekera et al., "Multi-interface Control Scheme on Strategy Management Architecture for Wireless resource optimization (WiSMA)," IEICE 2018 Communication Society Conference Proceedings, Sep. 11, 2018, p. 207, 3 pages (with English Translation).
(Continued)

*Primary Examiner* — Kouroush Mohebbi
(74) *Attorney, Agent, or Firm* — Fish & Richardson P.C.

(57) ABSTRACT

A wireless communication system in which wireless stations perform transmission, a plurality of wireless modules that are operated in a shared frequency band being installed in the wireless stations, wherein the wireless stations each include means for notifying a control device of environment information that includes capacity information regarding the wireless station and information regarding a surrounding wireless environment, the control device includes means for determining an operation mode of each wireless module of each wireless station based on the environment information collected from each wireless station, following a control guideline that is determined in advance, and notifying the wireless stations of the operation modes, and the wireless stations each include means for setting the operation modes in the plurality of wireless modules and changing connection of connection destination wireless stations according to the
(Continued)

(BEFORE CONTROL)

(AFTER CONTROL)

operation modes of the wireless modules, the wireless stations being notified of the operation modes by the control device.

6 Claims, 3 Drawing Sheets

(51) Int. Cl.
 *H04W 72/1263* (2023.01)
 *H04W 72/566* (2023.01)
 *H04W 88/06* (2009.01)

(56) References Cited

OTHER PUBLICATIONS

Morikura et al., "802.11 High Speed Wireless LAN Textbook Revised 3rd Edition," Impress R& D, Mar. 27, 2008, pp. 6-9, 5 pages (with English Translation).

* cited by examiner

WIRELESS COMMUNICATION SYSTEM, WIRELESS COMMUNICATION METHOD, AND WIRELESS STATION DEVICE

CROSS-REFERENCE TO RELATED APPLICATIONS

This application is a National Stage application under 35 U.S.C. § 371 of International Application No. PCT/JP2019/022983, having an International Filing Date of Jun. 10, 2019. The disclosure of the prior application is considered part of the disclosure of this application, and is incorporated in its entirety into this application.

TECHNICAL FIELD

The present invention relates to a wireless communication system, a wireless communication method, and a wireless station device that improve reduction in throughput that is caused by CSMA/CA (Carrier Sense Multiple Access with Collision Avoidance) control of each wireless station in an environment that is crowded with wireless LANs (Local Area Networks).

BACKGROUND ART

In recent years, wireless LANs of IEEE 802.11 standards are widely used not only in companies and public spaces but also in ordinary homes due to the spread of wireless terminals such as notebook personal computers and smartphones that are portable and have high performance. Wireless LANs of the IEEE 802.11 standards include wireless LANs of IEEE 802.11b/g/n standards, which use the 2.4 GHz band, and wireless LANs of IEEE 802.11a/n/ac standards, which use the 5 GHz band.

In wireless LANs of IEEE 802.11b standards and IEEE 802.11g standards, 13 channels are prepared between 2400 MHz and 2483.5 MHz at intervals of 5 MHz. However, when a plurality of channels are used at the same place, the maximum number of channels that can be simultaneously used is three or may be four, if the channels are used such that spectrums do not overlap to avoid interference.

In wireless LANs of IEEE 802.11a standards, a total of 19 channels are defined in the case of Japan, the 19 channels being constituted by 8 channels and 11 channels that do not overlap each other and are respectively defined between 5170 MHz and 5330 MHz and between 5490 MHz and 5710 MHz. Note that the bandwidth per channel is fixed to 20 MHz in the IEEE 802.11a standards.

The maximum transmission speed of a wireless LAN is 11 Mbps in the case of the IEEE 802.11b standards and is 54 Mbps in the case of the IEEE 802.11a standards and the IEEE 802.11g standards. However, the transmission speed referred to here is the transmission speed in a physical layer. Actually, a transmission efficiency in a MAC (Medium Access Control) layer is about 50 to 70%, and therefore an upper limit value of actual throughput is about 5 Mbps in the case of the IEEE 802.11b standards and is about 30 Mbps in the case of the IEEE 802.11a standards and the IEEE 802.11g standards. Also, the transmission speed is further reduced if wireless stations that transmit information increase.

On the other hand, with the spread of FTTH (Fiber To The Home) using optical fibers at homes, such as the 100 Base-T interface of Ethernet (registered trademark), high-speed lines that enable transmission as fast as 100 Mbps to 1 Gbps are widely provided in wired LANs, and there are demands for a further increase in the transmission speed in wireless LANs.

Therefore, in IEEE 802.11n standards completed in 2009, the channel bandwidth that had been fixed to 20 MHz was enlarged up to 40 MHz, and introduction of a spatial multiplexing transmission technology (MIMO: Multiple Input Multiple Output) was determined. If transmission and reception are performed by applying all functions defined in the IEEE 802.11n standards, a communication speed of up to 600 Mbps can be realized in a physical layer.

Furthermore, in IEEE 802.11ac standards completed in 2013, it was determined to enlarge the channel bandwidth to 80 MHz or up to 160 MHz (or 80+80 MHz) and introduce a multi-user MIMO (MU-MIMO) transmission method to which space division multiple access (SDMA) is applied. If transmission and reception are performed by applying all functions defined in the IEEE 802.11ac standards, a communication speed of up to about 6.9 Gbps can be realized in a physical layer.

Also, in IEEE 802.11ax standards that are currently being established, OFDMA (Orthogonal Frequency Division Multiple Access) that enables transmission and reception of frames by dividing the above-described channels of 20 MHz, 40 MHz, 80 MHz, 160 MHz, and 80+80 MHz into smaller sub channels will be defined. If OFDMA is used, transmission can be simultaneously performed by a plurality of wireless stations in each resource unit by dividing the above-described channels into smaller sub channels. Furthermore, in the IEEE 802.11ax standards, a function that increases communication opportunities while suppressing interference from another cell in a surrounding region through carrier sense threshold (CCA threshold) control will be defined.

Wireless LANs of the IEEE 802.11 standards operate in the 2.4 GHz frequency band or the 5 GHz frequency band, for which a license is unnecessary, and accordingly, each wireless base station of the IEEE 802.11 standards selects and uses a frequency channel from frequency channels that can be supported by the wireless base station, when forming a wireless LAN cell (BSS: Basic Service Set).

The cell is operated by writing the channel used in the cell, set values of the bandwidth and parameters other than the bandwidth, and other parameters that can be supported by the wireless base station, in a Beacon frame that is periodically transmitted or a Probe response frame that is transmitted in response to a Probe Request frame received from a wireless terminal, for example, and transmitting the frame in the frequency channel that is determined to be used, to notify wireless terminals under the coverage of the wireless base station and other wireless stations in a surrounding region.

There are the following four methods for selecting and setting the frequency channel, the bandwidth, and other parameters in a wireless base station.

(1) Method of using default parameter values as is, which are set by the manufacturer of the wireless base station.
(2) Method of using values that are manually set by a user who operates the wireless base station.
(3) Method of autonomously selecting and setting parameter values based on wireless environment information that is detected by each wireless base station when starting operation.
(4) Method of setting parameter values that are determined by a central control station such as a wireless LAN controller.

Also, the number of channels that can be simultaneously used at the same place is dependent on the bandwidth of channels that are used for communication, and is 3 in the case of wireless LANs in the 2.4 GHz band, and is 2, 4, 9, or 19 in the case of wireless LANs in the 5 GHz band, and accordingly, when a wireless LAN is actually introduced, a wireless base station needs to select a channel that is to be used in the BSS of the wireless base station (NPL 1).

If the channel bandwidth is enlarged to 40 MHz, 80 MHz, 160 MHz, or 80+80 MHz, the number of channels that can be simultaneously used at the same place in the 5 GHz band, which is 19 if the channel bandwidth is 20 MHz, is reduced to 9, 4, or 2. That is, the number of channels that can be used is reduced as the channel bandwidth is increased.

In an environment that is crowded with wireless LANs and in which the number of BSSs is greater than the number of channels that can be used, a plurality of BSSs use the same channel (OBSS: Overlapping BSS). Therefore, autonomous and distributed access control is used in wireless LANs to transmit data through carrier sensing only when a channel is vacant, by using CSMA/CA (Carrier Sense Multiple Access with Collision Avoidance).

Specifically, a wireless station for which a transmission request occurred initially performs carrier sensing only for a predetermined sensing period (DIFS: Distributed Inter-Frame Space) to monitor the state of a wireless medium, and performs random back-off if there is no transmission signal from another wireless station during the period. The wireless station continuously performs carrier sensing during the random back-off period as well, and obtains a right to use a channel if there is no transmission signal from another wireless station in this period as well. Note that transmission and reception performed by another wireless station is determined based on whether or not a signal that is greater than a preset carrier sense threshold is received. The wireless station that obtained the right to use can transmit data to other wireless stations in the same BSS and receive data from these wireless stations. If such CSMA/CA control is performed, throughput is reduced in an environment crowded with wireless LANs that use the same channel, because the frequency of the channel becoming busy is increased due to carrier sensing. Therefore, it is important to monitor a surrounding environment, select an appropriate channel, and select a transmission power value and a carrier sense threshold that enable simultaneous transmission and reception.

CITATION LIST

Non Patent Literature

[NPL 1] Supervised by Masahiro Morikura and Shuji Kubota, "802.11 HIGH-SPEED WIRELESS LAN TEXTBOOK", 3rd revised edition, Impress R&D, March 2008

SUMMARY OF THE INVENTION

Technical Problem

Methods for selecting the parameters described above, such as 2.4 GHz or 5 GHz, which is an operation frequency band of wireless base stations, and channels that are used in the operation frequency band are not defined in the IEEE 802.11 standards, and therefore each vendor adopts unique methods.

Also, wireless stations select the parameters described above in an autonomous and distributed manner, and therefore the parameters cannot be optimized in the entire system, and there is a problem in that user quality is significantly degraded particularly in an environment where the number of wireless stations is large.

Furthermore, wireless stations in which a plurality of wireless modules are installed are increasing in recent years. The aim is to enlarge a band that is used and increase user throughput in a service area by installing a plurality of wireless modules in the same housing and separately using frequency bands and channels.

However, user throughput cannot be improved if operation modes are not appropriately set according to capacities of the respective installed wireless modules and wireless terminals that correspond to the operation modes of the respective wireless modules are not appropriately connected.

An object of the present invention is to provide a wireless communication system, a wireless communication method, and a wireless station device that can appropriately set operation modes of a plurality of wireless modules that are installed in wireless stations, to improve throughput of the entire system and provide a high-quality wireless environment to each user.

Means for Solving the Problem

A first invention is a wireless communication system in which wireless stations perform transmission, a plurality of wireless modules that are operated in a shared frequency band being installed in the wireless stations, wherein the wireless stations each include means for notifying a control device of environment information that includes capacity information regarding the wireless station and information regarding a surrounding wireless environment, the control device includes means for determining an operation mode of each wireless module of each wireless station based on the environment information collected from each wireless station, following a control guideline that is determined in advance, and notifying the wireless stations of the operation modes, and the wireless stations each include means for setting the operation modes in the plurality of wireless modules and changing connection of connection destination wireless stations according to the operation modes of the wireless modules, the wireless stations being notified of the operation modes by the control device.

A second invention is a wireless communication method in which wireless stations perform transmission, a plurality of wireless modules that are operated in a shared frequency band being installed in the wireless stations, wherein the wireless stations each notify a control device of environment information that includes capacity information regarding the wireless station and information regarding a surrounding wireless environment, the control device determines an operation mode of each wireless module of each wireless station based on the environment information collected from each wireless station, following a control guideline that is determined in advance, and notifies the wireless stations of the operation modes, and the wireless stations set the operation modes in the plurality of wireless modules and change connection of connection destination wireless stations according to the operation modes of the wireless modules, the wireless stations being notified of the operation modes by the control device.

A third invention is a wireless station device in which a plurality of wireless modules that are operated in a shared frequency band are installed, the wireless station device including: means for notifying a control device of environment information that includes capacity information regarding the wireless station and information regarding a surrounding wireless environment; means for inputting and setting operation modes of the plurality of wireless modules that are determined by the control device based on the environment information collected from each wireless station, following a control guideline that is determined in advance; and means for setting the operation modes in the plurality of wireless modules and changing connection of connection destination wireless stations according to the operation modes of the wireless modules, the wireless station device being notified of the operation modes by the control device.

Effects of the Invention

According to the present invention, operation modes of a plurality of wireless modules installed in wireless stations can be appropriately set, and therefore it is possible to improve throughput of the entire system and provide a high-quality wireless environment to each user.

DESCRIPTION OF EMBODIMENTS

Figure 1:
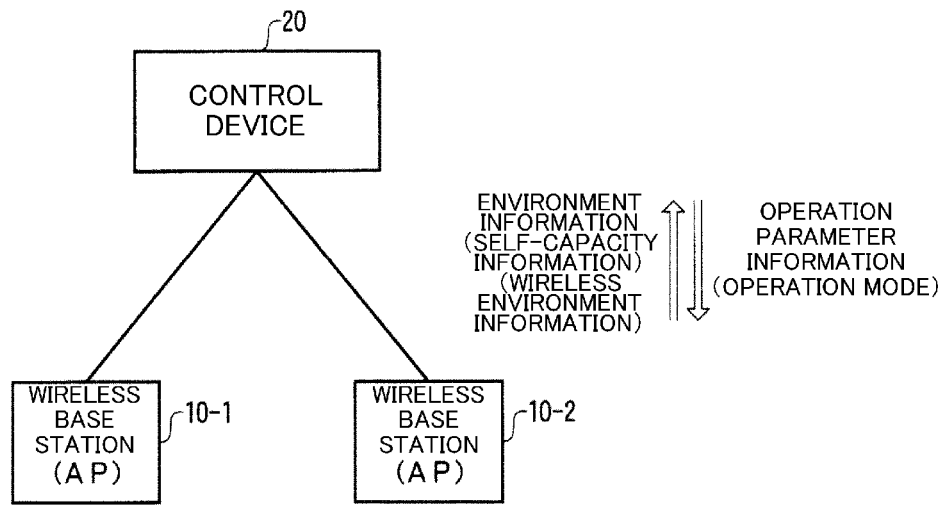
FIG. 1 is a diagram showing an example configuration of a wireless communication system according to the present invention.

FIG. 1 shows an example configuration of a wireless communication system according to the present invention. Here, frequency channel control of wireless base stations (AP) that are wireless stations in which a plurality of wireless modules (RFs) operated in a shared frequency band are installed will be described as an example.

In FIG. 1, the wireless communication system has a configuration in which a plurality of wireless base stations (APs) 10-1 and 10-2 are connected to a control device 20. Each of the APs 10-1 and 10-2 includes one or more wireless modules (RFs) and communicates with wireless terminals (not shown) that are under the coverage of the AP. The APs 10-1 and 10-2 each notify the control device 20 of environment information and operate the RFs based on operation parameter information that is given from the control device 20. The operation parameter information referred to herein is operation modes of the respective RFs.

Figure 2:
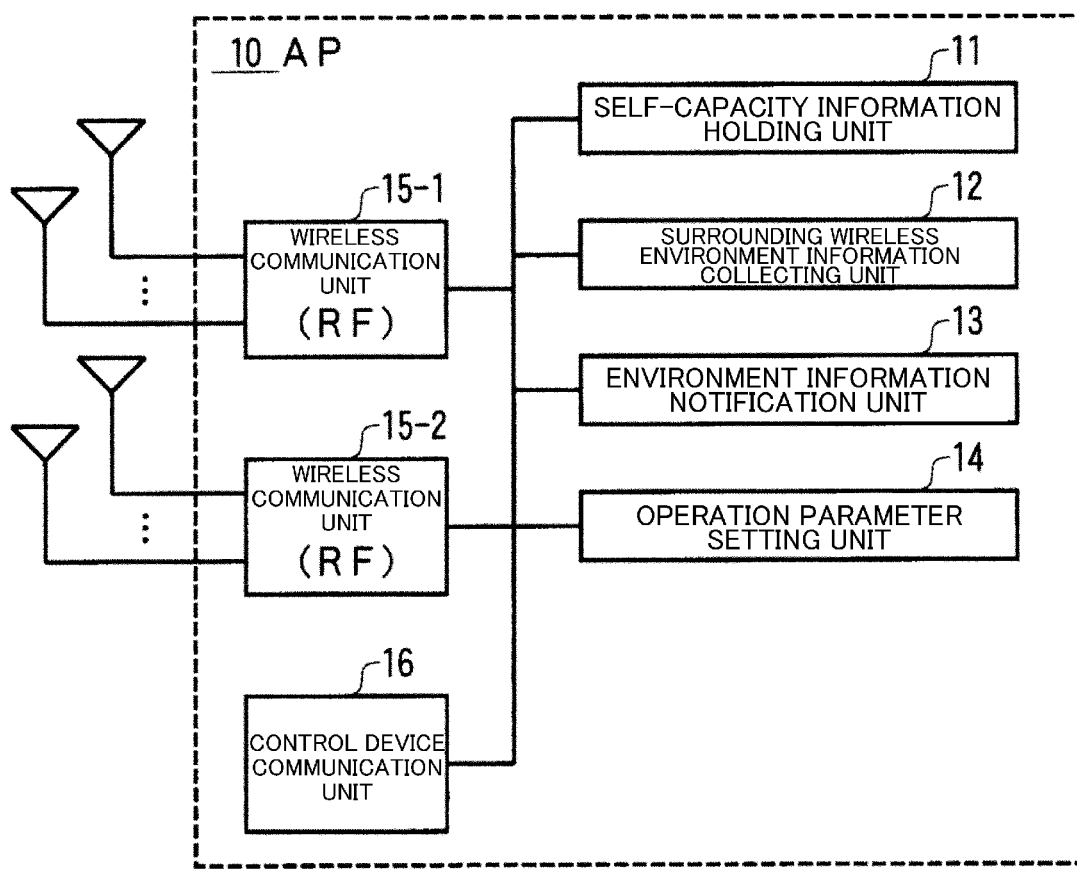
FIG. 2 is a diagram showing an example configuration of a wireless base station (AP) 10.

FIG. 2 shows an example configuration of a wireless base station (AP) 10. In FIG. 2, the AP 10 is constituted by a self-capacity information holding unit 11, a surrounding wireless environment information collecting unit 12, an environment information notification unit 13, an operation parameter setting unit 14, wireless communication units 15-1 and 15-2 including RFs, and a control device communication unit 16. The self-capacity information holding unit 11 holds capacity information regarding each RF that is installed. The surrounding wireless environment information collecting unit 12 collects information regarding a surrounding wireless environment. The environment information notification unit 13 notifies the control device 20 of environment information that includes the capacity information described above and the information regarding the surrounding wireless environment described above. The operation parameter setting unit 14 sets operation parameters (operation modes) of respective RFs based on operation parameter information that is given from the control device 20. The control device communication unit 16 performs wired or wireless communication with the control device 20.

Figure 3:
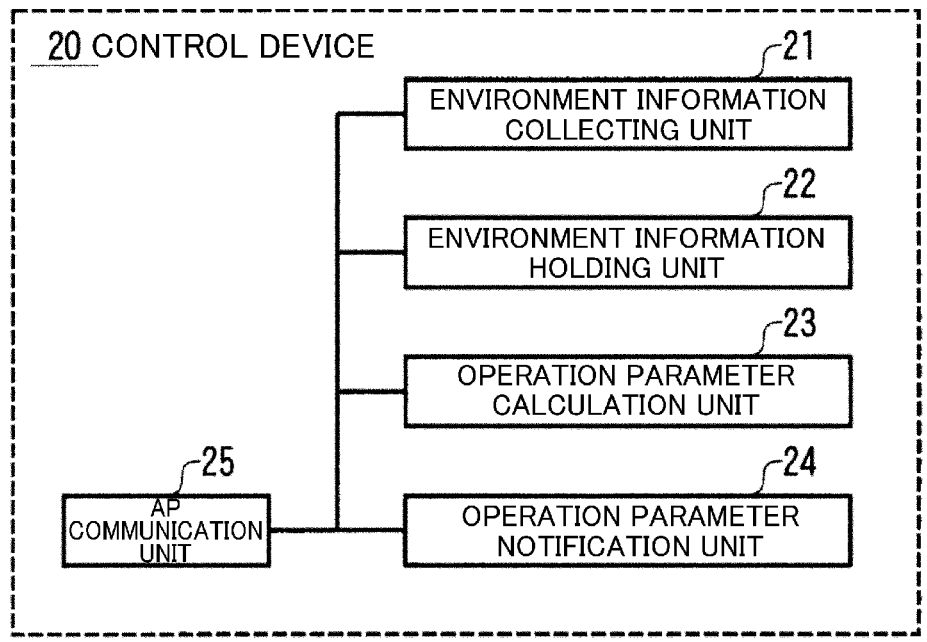
FIG. 3 is a diagram showing an example configuration of a control device 20.

FIG. 3 shows an example configuration of the control device 20. In FIG. 3, the control device 20 is constituted by an environment information collecting unit 21, an environment information holding unit 22, an operation parameter calculation unit 23, an operation parameter notification unit 24, and an AP communication unit 25. The environment information collecting unit 21 collects environment information that is given from each AP 10. The environment information holding unit 22 holds the collected environment information. The operation parameter calculation unit 23 determines an operation parameter (an operation mode) of each RF installed in each AP 10 based on the collected and held environment information. The operation parameter notification unit 24 gives a notification of the determined operation parameter (operation mode). The AP communication unit 25 performs wired or wireless communication with each AP 10.

Figure 5:
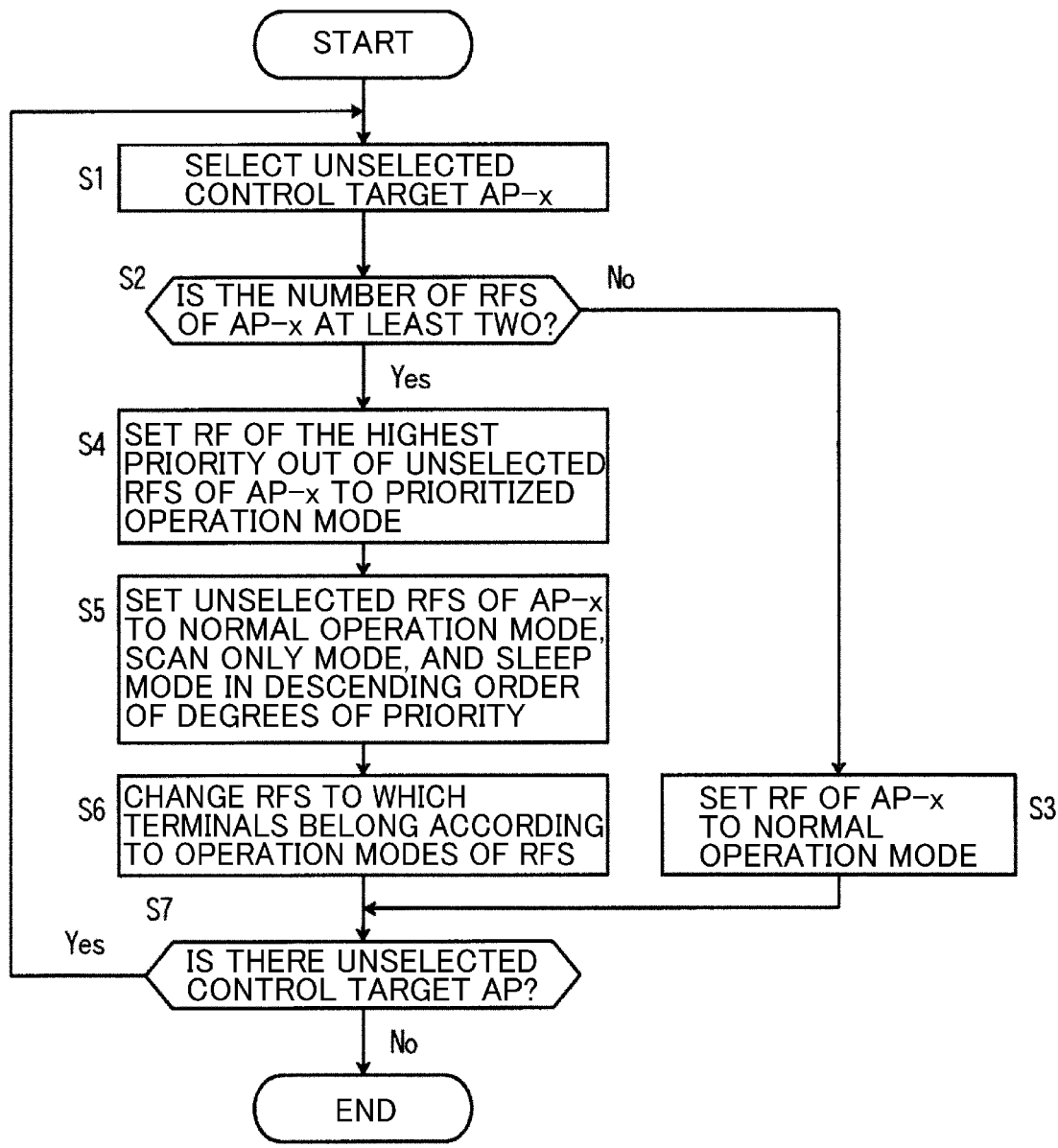
FIG. 5 is a flowchart showing a control flow of the control device 20 in the present invention.

FIG. 5 shows a control flow of the control device 20 in the present invention. Note that the control flow is executed by the operation parameter calculation unit 23 of the control device 20.

In FIG. 5, when the control flow is started, a wireless base station (AP-x) that has not been selected (has not yet been controlled) in the control flow is selected (step S1). Then, whether or not two or more wireless modules (RFs) are installed in the selected AP-x is checked (step S2). If two or more RFs are not installed, the operation mode of the AP-x is set to a normal operation mode (default value) (step S3), and the control flow is executed with respect to another unselected AP (step S7). On the other hand, if two or more RFs are installed, operation modes are set for the wireless modules in descending order of degrees of priority.

Here, the degree of priority of each RF is determined according to capacity information (e.g., wireless LAN standards 11a, 11b, 11g, 11n 20 MHz, 11n 40 MHz, 11ac, or 11ax) regarding the RF, RSSI information regarding connected terminals, the number of connected terminals, an accommodated data volume, or the like. For example, in a case where the degree of priority is determined based on standards that are supported by the RF, the degree of priority in the control flow becomes higher in the following order of wireless LAN standards: 11a, 11b, 11g, 11n 20 MHz, 11n 40 MHz, 11ac, and 11ax, because transmission/reception possible throughput increases in this order. That is, 11a<11b<11g<11n 20 MHz<11n 40 MHz<11ac<11ax.

First, the operation mode of an RF (which supports 11n, 11ac, or 11ax, for example) of the highest priority out of unselected RFs is set to a "prioritized operation mode" to accommodate high-throughput terminals (step S4).

Next, operation modes of unselected RFs are set to the "normal operation mode (default)", a "scan only mode" that does not allow connection of terminals, and a "sleep mode" in which a corresponding RF pauses operation, in descending order of degrees of priority (step S5). Then, with respect to terminals that are already connected to these RFs, connection destinations are changed to appropriate RFs according to the operation modes of the RFs (step S6). The processing in steps S1 to S6 is repeated until all APs are selected (step S7).

Figure 4:
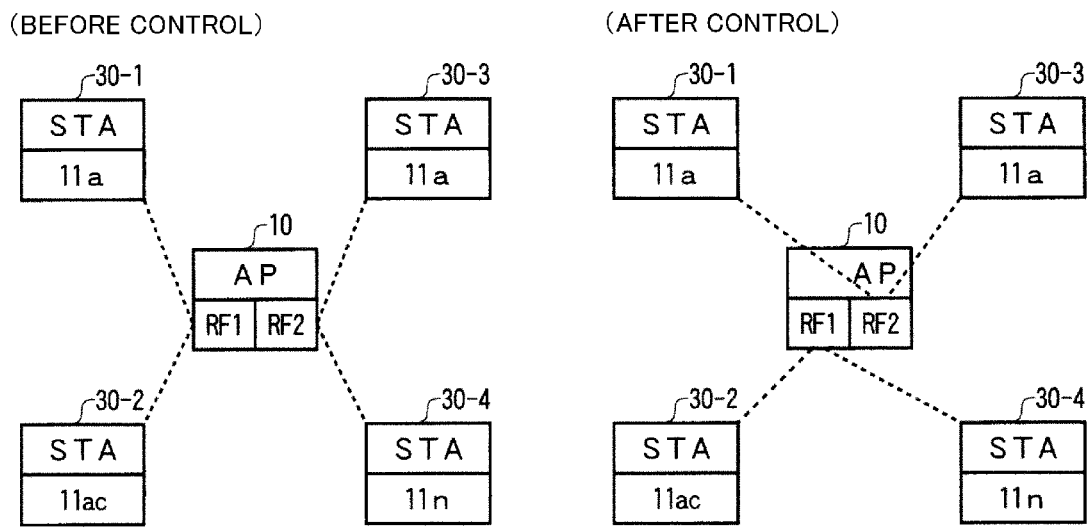
FIG. 4 is a diagram showing an example of control performed in the present invention.

FIG. 4 shows an example of control in which operation modes of wireless modules are determined according to capacity information regarding the RFs. Two RFs are installed in the AP 10. Before the control is performed, the operation mode of each RF is the normal operation mode, and accordingly, wireless terminals (STAs) 30-1 to 30-4 select connection destination RFs on their own decision in an autonomous and distributed manner. Here, the STA 30-1 of the wireless LAN standards 11a and the STA 30-2 of the wireless LAN standards 11ac are connected to an RF 1 of the AP 10. Also, the STA 30-3 of the wireless LAN standards 11a and the STA 30-4 of the wireless LAN standards 11n are connected to an RF 2 of the AP 10. Therefore, capacities of the RF 1 and the RF 2 are limited to the wireless LAN standards 11a.

As a result of the control flow being used, in the system after the control, the RF 1 of the AP 10 is operated in the "prioritized operation mode" in which terminals of the wireless LAN standards 11n and wireless LAN standards with higher throughput are accommodated. Also, the RF 2 is operated in the "normal operation mode" to accommodate all the other terminals. As a result, the STA 30-2 of the wireless LAN standards 11ac and the STA 30-4 of the wireless LAN standards 11n are accommodated by the RF 1 that is set in the prioritized operation mode, and high-speed communication is realized. On the other hand, the STAs 30-1 and 30-3 of the wireless LAN standards 11a are accommodated by the RF 2.

REFERENCE SIGNS LIST

10 Wireless base station (AP)
11 Self-capacity information holding unit
12 Surrounding wireless environment information collecting unit
13 Environment information notification unit
14 Operation parameter setting unit
15 Wireless communication unit
16 Control device communication unit
20 Control device
21 Environment information collecting unit
22 Environment information holding unit
23 Operation parameter calculation unit
24 Operation parameter notification unit
25 AP communication unit

The invention claimed is:

1. A wireless communication system in which wireless stations are configured to perform transmission,
wherein each of the wireless stations is configured to notify a control device of environment information that includes capacity information regarding the wireless station and information regarding a surrounding wireless environment, wherein each wireless station comprises a plurality of wireless modules, and each wireless module supports a limited number of standards,
the control device is configured to determine an operation mode of each wireless module of each wireless station based on the environment information collected from each wireless station, following a control guideline that is determined in advance, and to notify the wireless stations of the operation modes, wherein determining the operation mode of each wireless module of each wireless station comprises:
determining a capacity for each wireless module, wherein the capacity is indicated by the limited number of standards supported by the wireless module,
determining a priority for each wireless module based on the corresponding capacity, wherein a wireless module with a high capacity is assigned a high priority, and
determining the operation mode for each wireless module in accordance with the priority, and
each of the wireless stations is configured to set the operation modes in the plurality of wireless modules and to change connection of connection destination wireless stations according to the operation modes of the wireless modules, the wireless stations being configured to be notified of the operation modes by the control device.

2. The wireless communication system according to claim 1,
wherein, according to the control guideline, out of the wireless modules, a wireless module of the highest priority is set to a prioritized operation mode that corresponds to high-speed communication, and other wireless modules are respectively set to a normal operation mode, a scan only mode, and a sleep mode in descending order of degrees of priority, the normal operation mode being a default mode, the scan only mode being a mode that does not allow connection of a wireless station, and the sleep mode being a mode in which a corresponding wireless module pauses operation.

3. A wireless communication method in which wireless stations perform transmission method comprising:
each of the wireless stations notifying a control device of environment information that includes capacity information regarding the wireless station and information regarding a surrounding wireless environment, wherein each wireless station comprises a plurality of wireless modules, and each wireless module supports a limited number of standards,
the control device determining an operation mode of each wireless module of each wireless station based on the environment information collected from each wireless station, following a control guideline that is determined in advance, and notifying the wireless stations of the operation modes, wherein determining the operation mode of each wireless module of each wireless station comprises:
determining a capacity for each wireless module, wherein the capacity is indicated by the limited number of standards supported by the wireless module,
determining a priority for each wireless module based on the corresponding capacity, wherein a wireless module with a high capacity is assigned a high priority, and
determining the operation mode for each wireless module in accordance with the priority, and
the wireless stations setting the operation modes in the plurality of wireless modules and changing connection of connection destination wireless stations according to the operation modes of the wireless modules, the wireless stations being notified of the operation modes by the control device.

4. The wireless communication method according to claim 3, wherein, according to the control guideline, out of the wireless modules, a wireless module of the highest priority is set to a prioritized operation mode that corresponds to high-speed communication, and other wireless modules are respectively set to a normal operation mode, a scan only mode, and a sleep mode in descending order of degrees of priority, the normal operation mode being a default mode, the scan only mode being a mode that does not allow connection of a wireless station, and the sleep mode being a mode in which a corresponding wireless module pauses operation.

5. A wireless station in which a plurality of wireless modules that are operated in a shared frequency band are installed, the wireless station comprising one or more processors configured to perform operations comprising:

notifying a control device of environment information that includes capacity information regarding the wireless station and information regarding a surrounding wireless environment, wherein each wireless station comprises a plurality of wireless modules, and each wireless module supports a limited number of standards;

inputting and setting operation modes of the plurality of wireless modules that are determined by the control device based on the environment information collected from each wireless station, following a control guideline that is determined in advance, wherein determining the operation mode of each wireless module of each wireless station comprises:

determining a capacity for each wireless module, wherein the capacity is indicated by the limited number of standards supported by the wireless module, determining a priority for each wireless module based on the corresponding capacity, wherein a wireless module with a high capacity is assigned a high priority, and determining the operation mode for each wireless module in accordance with the priority; and setting the operation modes in the plurality of wireless modules and changing connection of connection destination wireless stations according to the operation modes of the wireless modules, the wireless station being notified of the operation modes by the control device.

6. The wireless station according to claim 5, wherein, according to the control guideline, out of the wireless modules, a wireless module of the highest priority is set to a prioritized operation mode that corresponds to high-speed communication, and other wireless modules are respectively set to a normal operation mode, a scan only mode, and a sleep mode in descending order of degrees of priority, the normal operation mode being a default mode, the scan only mode being a mode that does not allow connection of a wireless station, and the sleep mode being a mode in which a corresponding wireless module pauses operation.

* * * * *